A. W. HAAG.
Water-Wheel.
No. 169,165.  Patented Oct. 26, 1875.
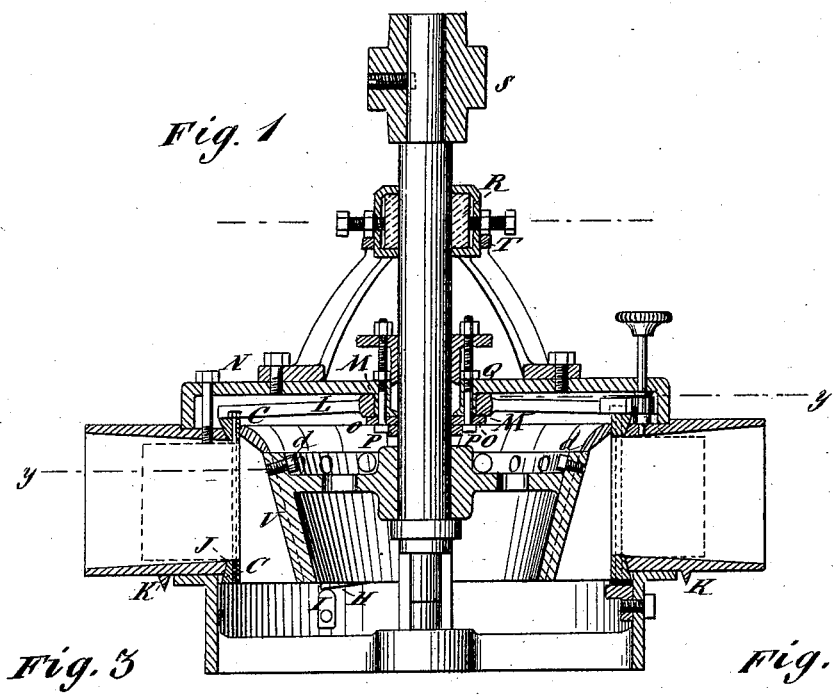

UNITED STATES PATENT OFFICE.

ADAM W. HAAG, OF FLEETWOOD, PENNSYLVANIA.

IMPROVEMENT IN WATER-WHEELS.

Specification forming part of Letters Patent No. 169,165, dated October 26, 1875; application filed September 11, 1875.

*To all whom it may concern:*

Be it known that I, ADAM W. HAAG, of Fleetwood, in the county of Berks and State of Pennsylvania, have invented a new and Improved Water-Wheel, of which the following is a specification:

The invention will first be described in connection with drawing, and then pointed out in the claim.

Figure 1 is a sectional elevation of my improved wheel, taken on line $x$ $x$, Fig. 2. Fig. 2 is partly a plan and partly a horizontal section on line $y$ $y$ of Fig. 1. Fig. 3 is a detail of the wheel in side elevation; and Fig. 4 is a horizontal section through the bearings for the shaft on line $z$ $z$, Fig. 1.

Similar letters of reference indicate corresponding parts.

A represents the gates, which are pivoted at B to the upper and lower rings C, which are turned by the shaft D and gears E, for opening and closing the gates. Behind the pivots the gates have a spring, F, which throws out the points of the gates into the notches G in the guides when they close, to shut them tightly. The lower ring C has cams H, which ride up the studs I when the gate closes, and press the beveled side of the ring tight against the case at J; also press the ring tight against the lower ends of the gates, and also press the upper ends tight against the upper ring C, making tight joints when closed. On the bottom of the case is a V-shaped rib, K, which is designed to press into the flow of the pen-stock, to pack tight and prevent leakage of water. The upper gate-ring is suspended from the spider L, which turns on the hub M of the top N of the wheel-case, and is held on the hub by the ring O and bolts P, said bolts being extended above the nuts Q at the top of the case, which secure the bolts, and serving for the bolts of the stuffing-box. The shaft-bearing is contrived in two parts, R, so as to be applied to and removed from the shaft below the coupling S, and they have a ring, T, to hold them together. The buckets U are made separate from the wheel-hub V, and are connected by a dovetail flange, $a$, fitting in a corresponding groove, and fastened by a bolt, $d$, the object being to replace broken buckets readily.

Having thus described my invention, I claim as new and desire to secure by Letters Patent—

1. The combination of a spring, F, with a gate, A, pivoted at B, and arranged to shut in a notch, G, in the guide, substantially as specified.

2. The combination of cams H with the gate-rings and gates, contrived to close the rings and buckets tightly, substantially in the manner described.

3. The V-ring K, combined with the gate-case, substantially as specified.

4. The bearing for the shaft, constructed in two parts, R, and provided with a ring, T, to hold them together.

ADAM W. HAAG.

Witnesses:
LEWIS SCHAEFFER,
WILLIAM S. MERKEL.